United States Patent
Sharma

(10) Patent No.: US 7,388,857 B2
(45) Date of Patent: Jun. 17, 2008

(54) METHOD AND SYSTEM FOR SYNCHRONIZING TWO END TERMINALS USING BEACON SYNCHRONIZATION WITH MULTIPLE CHANNELS IN A WIRELESS LOCAL AREA NETWORK

(75) Inventor: Sanjeev K. Sharma, Fremont, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 974 days.

(21) Appl. No.: 10/822,589

(22) Filed: Apr. 12, 2004

(65) Prior Publication Data

US 2005/0226207 A1  Oct. 13, 2005

(51) Int. Cl.
*H04J 3/06* (2006.01)
(52) U.S. Cl. ............... 370/350; 370/503; 455/561; 455/502; 455/41.2
(58) Field of Classification Search ............ 370/350, 370/503, 343, 345; 455/561, 502, 500, 132, 455/63.1, 41.2
See application file for complete search history.

(56) References Cited

U.S. PATENT DOCUMENTS 7,151,945 B2*  12/2006  Myles et al. ............... 455/502
7,221,667 B2*  5/2007  Hori et al. ................. 370/338
2004/0125787 A1*  7/2004  May et al. .................. 370/350
2005/0286446 A1*  12/2005  Barber ....................... 370/278

* cited by examiner

*Primary Examiner*—Blane J. Jackson
(74) *Attorney, Agent, or Firm*—Knobbe Martens Olson & Bear LLP

(57) ABSTRACT

A system and method of synchronizing two end terminals using beacon synchronization in a wireless local area network are disclosed. In one embodiment, the method comprises i) communicating with a first terminal via first and second channels and communicating with a second terminal via the first and second channels, ii) transmitting a first series of beacon frames ($B_{11}$, $B_{21}$, $B_{31}$, ..., $B_{i1}$, ..., and $B_{n1}$) and a second series of beacon frames ($B_{12}$, $B_{22}$, $B_{32}$, ..., $B_{i2}$, ..., and $B_{n2}$) over the first and second channels, respectively, iii) obtaining beacon intervals ($b_{i1}$, $b_{i2}$), wherein $b_{i1}$ represents the beacon interval between the $i^{th}$ beacon frame ($B_{i1}$) and the $(i+1)^{th}$ beacon frame ($B_{(i+1)1}$) for the first series of beacon frames and $b_{i2}$ represents the beacon interval between the $i^{th}$ beacon frame ($B_{i2}$) and the $(i+1)^{th}$ beacon frame ($B_{(i+1)2}$) for the second series of beacon frames, iv) calculating the beacon interval offset value ($\Delta b_i = |b_i 1 - b_i 2|$) and v) setting the interval between the beacon frames ($B_{(i+1)1}$ and $B_{(i+2)1}$) in the first channel, and the interval between the beacon frames ($B_{(i+1)2}$ and $B_{(i+2)2}$) in the second channel, based on the calculated offset value ($\Delta b_i$) so as to perform beacon synchronization.

20 Claims, 5 Drawing Sheets

Channel 1 (B1): $B_{11}$  $B_{21}$  $B_{31}$  .... $B_{i1}$  .... $B_{n1}$

Channel 2 (B2): $B_{12}$  $B_{22}$  $B_{32}$  .... $B_{i2}$  .... $B_{n2}$

FIG. 6A

|  | $b_{11}$ | $b_{21}$ | $b_{31}$ | $b_{41}$ |
|---|---|---|---|---|
| Channel 1 (B1): | 30 | 30 | 32 | 30 ( 32 - 2 ) |
|  | off. 0 | off. 0 | off. 2 | off. 0 |
| Channel 2 (B2): | 30 | 30 | 30 | 30 |
|  | $b_{12}$ | $b_{22}$ | $b_{32}$ | $b_{42}$ |

FIG. 6B

|  | $b_{11}$ | $b_{21}$ | $b_{31}$ | $b_{41}$ |
|---|---|---|---|---|
| Channel 1 (B1): | 30 | 30 | 32 | 32 |
|  | off. 0 | off. 0 | off. 2 | off. 0 |
| Channel 2 (B2): | 30 | 30 | 30 | 32 ( 30 + 2 ) |
|  | $b_{12}$ | $b_{22}$ | $b_{32}$ | $b_{42}$ |

METHOD AND SYSTEM FOR SYNCHRONIZING TWO END TERMINALS USING BEACON SYNCHRONIZATION WITH MULTIPLE CHANNELS IN A WIRELESS LOCAL AREA NETWORK

BACKGROUND OF THE INVENTION

1. Field of the Invention

This invention relates to a data communication system, and particularly to a method and system for synchronizing two end terminals using beacon synchronization in a wireless local area network.

2. Description of the Related Technology

Recently a variety of computer network systems have been widely used. Such network systems include a local area network (LAN), a wide area network (WAN), a wireless local area network (WLAN), a wireless personal area network (WPAN), a general packet radio service (GPRS) network and other wireless network systems. The network systems allow communication between various end terminals such as a personal computer (desktop, laptop, and palmtop), a mobile phone, or other portable communication devices. It is typical that such network systems include at least one bridge element or hub such as an access point (or access node) where user traffic enters and exits a communications network. Among the network systems, a WLAN is a network that allows access to, for example, the Internet without the need for any wired connections to the user's device (end terminal). By using a WLAN, a user can wirelessly send email, web browse and print documents via local printers, etc.

A WLAN is defined in the IEEE 802.11 standard. The 802.11 standard defines two modes: infrastructure mode and ad hoc mode. In infrastructure mode, the wireless network includes at least one access point in data communication with the wired network infrastructure and a set of wireless end terminals or stations. Since WLANs typically require access to the wired LAN for services (file servers, printers, Internet links, etc.), they mostly operate in infrastructure mode. In ad hoc mode, which is also called peer-to-peer mode, a set of 802.11 wireless stations communicate directly with one another without using an access point or any connection to a wired network. This mode is useful for quickly and easily setting up a wireless network anywhere a wireless infrastructure does not exist, such as a hotel room or an airport, etc. Whether the system operates either in infrastructure mode or ad hoc mode, the synchronization of communication data between the two end stations is an important issue in WLAN as in other communication systems.

SUMMARY OF CERTAIN INVENTIVE ASPECTS OF THE INVENTION

One aspect of the invention provides a method of synchronizing two end terminals in a wireless local area network. The method comprises i) communicating with a first terminal via first and second channels and communicating with a second terminal via the first and second channels, ii) transmitting a first series of beacon frames ($B_{11}$, $B_{21}$, $B_{31}$, ..., $B_{i1}$, ..., and $B_{n1}$) and a second series of beacon frames ($B_{12}$, $B_{22}$, $B_{32}$, ..., $B_{i2}$, ..., and $B_{n2}$) over the first and second channels, respectively, iii) obtaining beacon intervals ($b_{i1}$, $b_{i2}$), wherein $b_{i1}$ represents the beacon interval between the $i^{th}$ beacon frame ($B_{i1}$) and the $(i+1)^{th}$ beacon frame ($B_{(i+1)1}$) for the first series of beacon frames and $b_{i2}$ represents the beacon interval between the $i^{th}$ beacon frame ($B_{i2}$) and the $(i+1)^{th}$ beacon frame ($B_{(i+1)2}$) for the second series of beacon frames, iv) calculating the beacon interval offset value ($\Delta b_i = |b_i 1 - b_i 2|$) and v) setting the interval between the beacon frames ($B_{(i+1)1}$ and $B_{(i+2)1}$) in the first channel, and the interval between the beacon frames ($B_{(i+1)2}$ and $B_{(i+2)2}$) in the second channel, based on the calculated offset value ($\Delta b_i$) so as to perform beacon synchronization.

Another aspect of the invention provides a method of synchronizing two end terminals in a wireless local area network including an access point. The method comprises i) communicating data wirelessly between the access point and a first terminal via first and second channels and between the access point and a second terminal via the first and second channels, ii) transmitting, at the access point, a first series of beacon frames ($B_{11}$, $B_{21}$, $B_{31}$, ..., $B_{i1}$, ..., and $B_{n1}$) and a second series of beacon frames ($B_{12}$, $B_{22}$, $B_{32}$, ..., $B_{i2}$, ..., and $B_{n2}$) over the first and second channels, respectively, iii) obtaining beacon intervals ($b_{i1}$, $b_{i2}$), wherein $b_{i1}$ represents the beacon interval between the $i^{th}$ beacon frame ($B_{i1}$) and the $(i+1)^{th}$ beacon frame ($B_{(i+1)1}$) for the first series of beacon frames and $b_{i2}$ represents the beacon interval between the $i^{th}$ beacon frame ($B_{i2}$) and the $(i+1)^{th}$ beacon frame ($B_{(i+1)2}$) for the second series of beacon frames, iv) storing the obtained beacon intervals ($b_{i1}$, $b_{i2}$), v) calculating, at the access point, the beacon interval offset value ($\Delta b_i = |b_i 1 - b_i 2|$) and vi) setting, at the access point, the interval between the beacon frames ($B_{(i+1)1}$ and $B_{(i+2)1}$) in the first channel, and the interval between the beacon frames ($B_{(i+1)2}$ and $B_{(i+2)2}$) in the second channel, based on the calculated offset value ($\Delta b_i$) so as to perform beacon synchronization.

BRIEF DESCRIPTION OF THE DRAWINGS

The foregoing and other features of the invention will become more fully apparent from the following description and appended claims taken in conjunction with the following drawings, in which like reference numerals indicate identical or functionally similar elements.

FIGS. 6A-6C illustrate frame sequences for further explaining the flowchart shown in FIG. 5.

DETAILED DESCRIPTION OF CERTAIN EMBODIMENTS OF THE INVENTION

Figure 1:
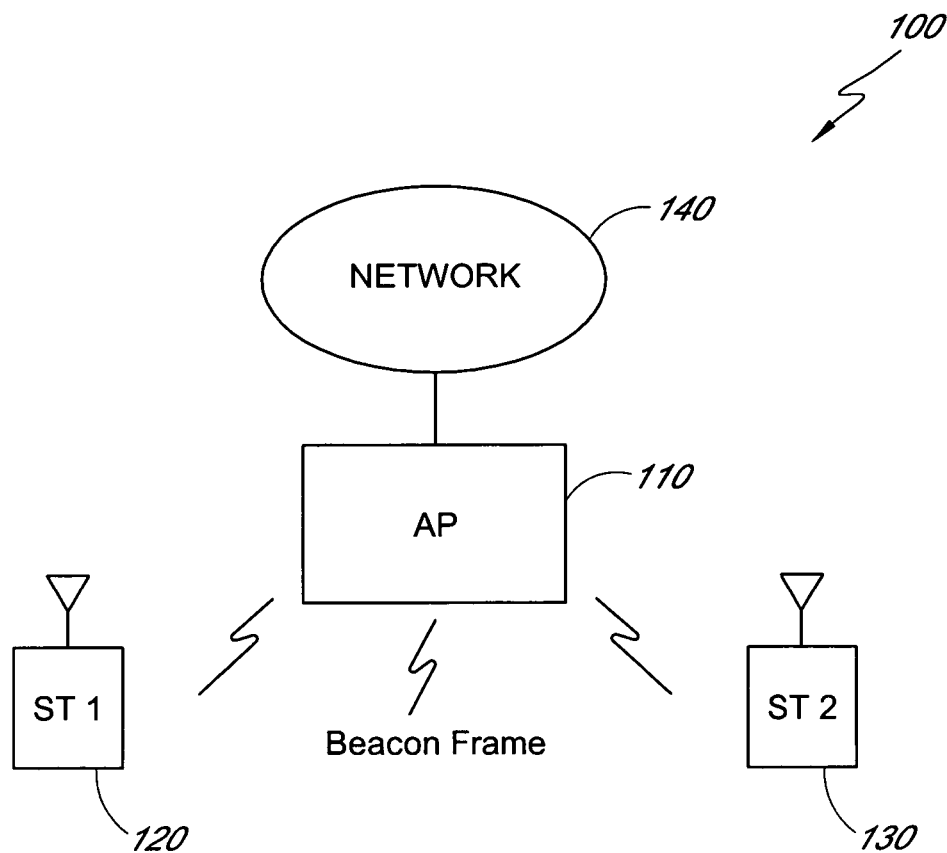
FIG. 1 illustrates a typical wireless network system including an access point.

FIG. 1 illustrates a typical wireless network system 100. The network system 100 comprises an access point (AP) 110, first and second stations (ST1, ST2) 120, 130 and a network 140.

The access point 110, which is also typically referred to as "an access node" or "a wireless bridge", is in wireless data communication with the stations 120, 130. For example, when the station 120 transmits data to the station 130, the transmitted data is received in the access point 110 first, and thereafter, the access point 110 transmits the received data to the station 130. That is, the access point 110 functions as a bridge between the stations 120, 130. In one embodiment, the access point 110 may be one of the following products: Airespace 1200, available from Airespace Inc., IronPoint, available from Foundry Networks, or Altitude 300 and Summit 300, available from Extreme Networks, for example.

Each of the stations 120 and 130 is typically referred to as an end terminal, a user device, a client terminal, a client device or a client. Each of the stations 120, 130 may be, for example, a personal computer (desktop, laptop and palm-top), a mobile phone, or other portable communication devices such as a hand-held PC, a wallet PC and a personal digital assistant (PDA).

The network 140 may include an IEEE 802.11a/11b/11g network, a wireless local area network (WLAN), a wireless personal area network (WPAN), a general packet radio service (GPRS) network, a global system for mobile communication (GSM) network, a code division multiple access (CDMA) network, a Bluetooth network or other wireless networks. A description of the general operation of a typical network system, including an access point, can be found, for example, by Brian P. Crow et. al, "IEEE 802.11 Wireless Local Area Networks", IEEE Communications Magazine, September 1997, pp. 116-126, which is incorporated by reference herein.

Figure 2:
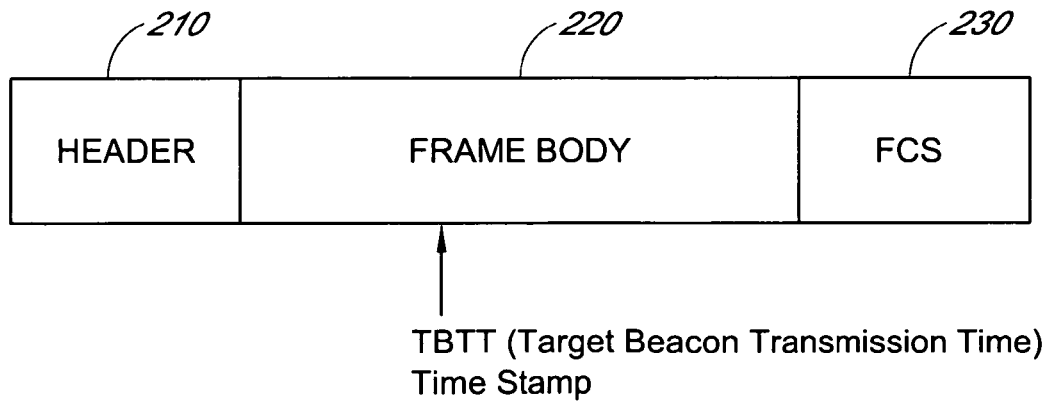
FIG. 2 illustrates a simplified data format of a typical beacon frame.

In a certain wireless network environment such as the IEEE 802.11 network, the access point 110 regularly generates and transmits beacon frames as shown, for example, in FIG. 2. Each of the beacon frames includes a header 210, a frame body 220 and a frame check sequence (FCS) 230. The frame body 220 generally includes a time stamp field and a target beacon transmission time (TBTT) field as shown in FIG. 2. TBTT represents the interval of two adjacent beacon frames. Specifically, TBTT represents the time interval between the time an access point transmits a beacon frame and the time the access point transmits the next beacon frame. Generally, the beacon frames contain a time stamp of the access point's interval clock at the moment of the transmission. A receiving station checks the value of its clock at the receiving moment, and adjusts the clock so as to keep the received access point's interval clock synchronized.

In a wireless communication network such as the IEEE 802.11 network, it is common that the access point wirelessly communicates with stations via more than one channel. In such a multiple channel (either physical or logical) environment, the stations transmit and receive multiple data streams such as audio/video applications. In this situation, the synchronization of communication data between the two end terminal devices is very important in order to guarantee that the audio/video applications are received without perceiving jitter. Otherwise, some of the data frames may be received out of synchronization, and this makes it difficult to provide users with a guaranteed quality of service (QoS). Thus, there has been a need to provide synchronization of the wireless system in a multiple channel environment such as IEEE 802.11 based network.

One aspect of the invention provides a system and method of synchronizing communication data between two end terminal devices in a multiple channel environment. In one embodiment of the invention, the system provides synchronization of communication data by calculating the interval offset of the beacon frames between two channels and setting the interval for the next beacon frames in each channel using the calculated offset value.

Figure 3:
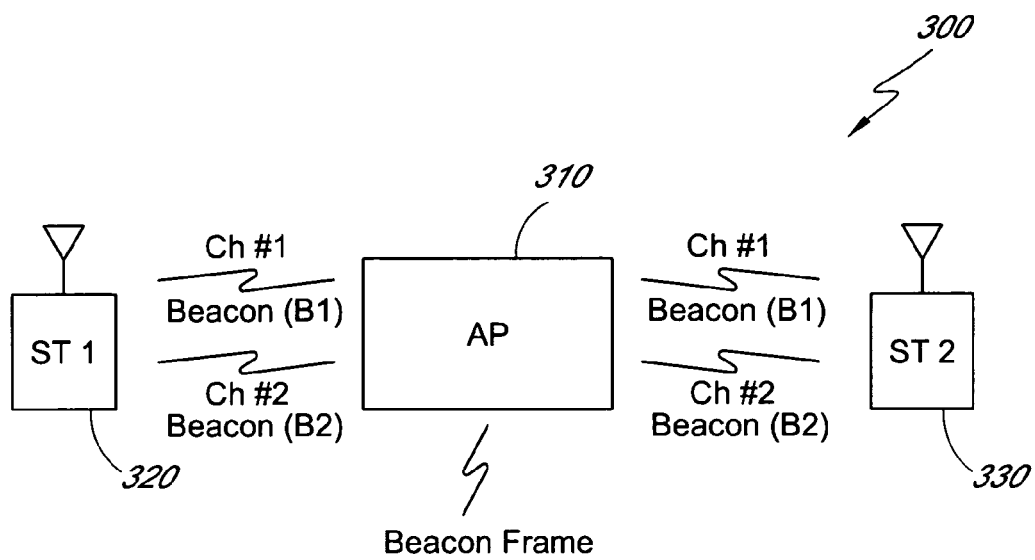
FIG. 3 illustrates a wireless network system according to one embodiment of the invention.

FIG. 3 illustrates a wireless network system 300 according to one embodiment of the invention. The system 300 includes an access point 310, and first and second stations 320, 330. In one embodiment of the invention, data communication within the system 300 is carried out using IEEE 802.11 (802.11a/11b/11g) or other wireless communication standards, either known today or developed in the future. The specification of IEEE 802.11a/11b/11g can be found, for example, at http://standards.ieee.org/getieee802/802.11.html. The specifications of IEEE 802.11a/11b/11g are incorporated herein by reference.

In one embodiment, the access point 310 is either wirelessly or wiredly in data communication with other communication network system (not shown). The communication network system may comprise, for instance, a WLAN, a WPAN, a GPRS network, a GSM network, a CDMA network, a Bluetooth network or other wireless networks.

In one embodiment of the invention, the access point 310 includes a multiple channel medium access control (MC-MAC) based access point. The medium access control (MAC) is an effective methodology that allows devices connected to a network system to share their interconnecting media. Due to the shared nature of the media, a MC-MAC based access point allows more than one device to send data at the same time.

In one embodiment, the access point 310 can handle two or more channels, although only two channels (channel 1, 2) are shown in FIG. 3. In one embodiment, each of the stations 320, 330 is a multiple channel based station which handles more than one channel. Thus, in this embodiment, the access point 310 is in wireless data communication with the station 320 via channels 1 and 2. In addition, the access point 310 wirelessly communicates with the station 330 via channels 1 and 2. Each of the channels 1 and 2 may be either a physical channel (such as in multi-channel MAC based system) or logical channel (such as spatial channels).

Figure 4:
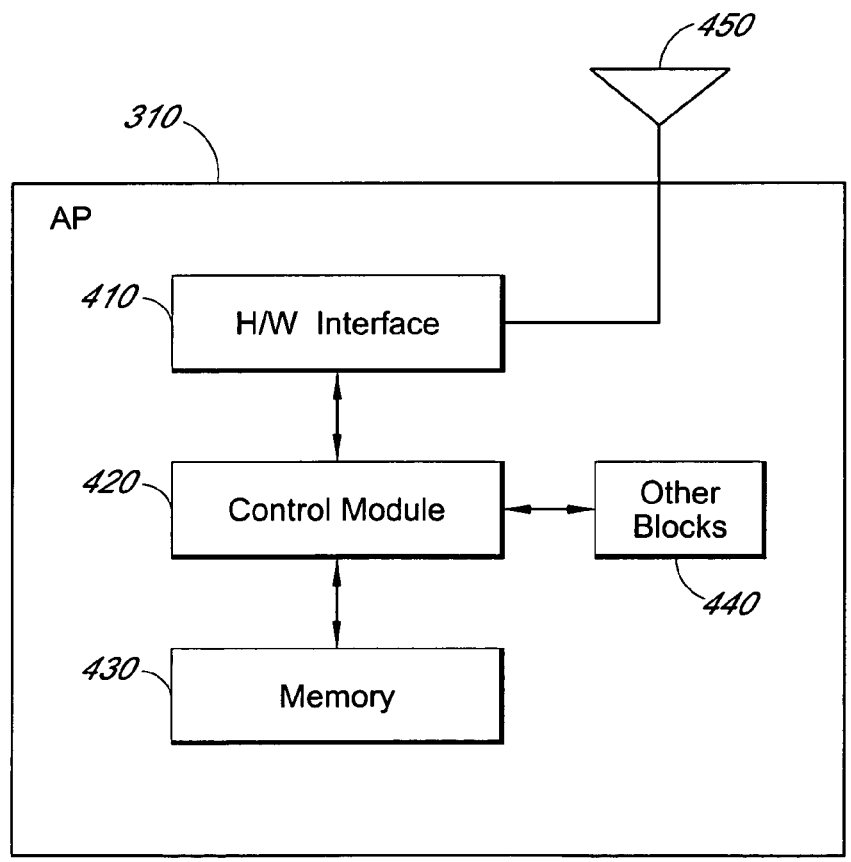
FIG. 4 illustrates an exemplary block diagram of the access point of the system shown in FIG. 3.

FIG. 4 illustrates an exemplary block diagram of the access point according to one embodiment of the invention. In this embodiment, the access point 310 includes a hardware interface 410, a control module 420, a memory 430, other blocks 440 and a transmitter/receiver (Tx/Rx) 450. The control module 420 is in data communication with the hardware interface 410, the memory 430 and other blocks 440.

The hardware interface 410 performs typical interfacing function between the Tx/Rx 450 and the control module 420. In one embodiment, the hardware interface 410 generates and transmits a first series of beacon frames (B1: $B_{11}$, $B_{21}$, $B_{31}$, ..., $B_{i1}$, ..., $B_{n1}$; for convenience, will be also collectively referred to as "B1") and a second series of beacon frames (B2: $B_{12}$, $B_{22}$, $B_{32}$, ..., $B_{i2}$, ..., $B_{n2}$; for convenience, will be also collectively referred to as "B2") via the Tx/Rx 450 under the control of the control module 420. In one embodiment, the hardware interface 410 includes a hardware timer (not shown) that generates the series of beacon frames.

The other blocks 440 may include typical OSI layers such as an application layer, a network layer (such as TCP/IP) and a driver and OS abstraction layer (all not shown). The other blocks 440 may also include a bridging function section and an association table (not shown). The bridging function section performs wireless and/or wired interfacing with other network systems, which are in data communication with the access point 310. The association table stores an IP address and a MAC address, which identifies the stations in a MAC based network system.

The memory 430 is in data communication with the control module 420. In one embodiment, the memory 430 stores information which is used by the control module 420 to perform the synchronization procedure according to embodiments of the invention. Such information may include, but is not limited to, beacon interval information and beacon interval offset values. In one embodiment, the memory 430 may include a random access memory (RAM), a programmable ROM, a flash memory, EEPROM and so on.

In one embodiment, the control module 420 is in data communication with the memory 430 via a wireless communication standard protocol such as IEEE 802.11a/11b/11g. In another embodiment, the control module 420 internally stores such information and performs the beacon synchronization based on the stored information without using a separate memory. In one embodiment, the control module 420 includes a MAC protocol firmware (not shown) configured to operate with the IEEE 802.11 network. In this embodiment, the MAC protocol firmware includes an upper MAC section and a lower MAC section.

Figure 5:
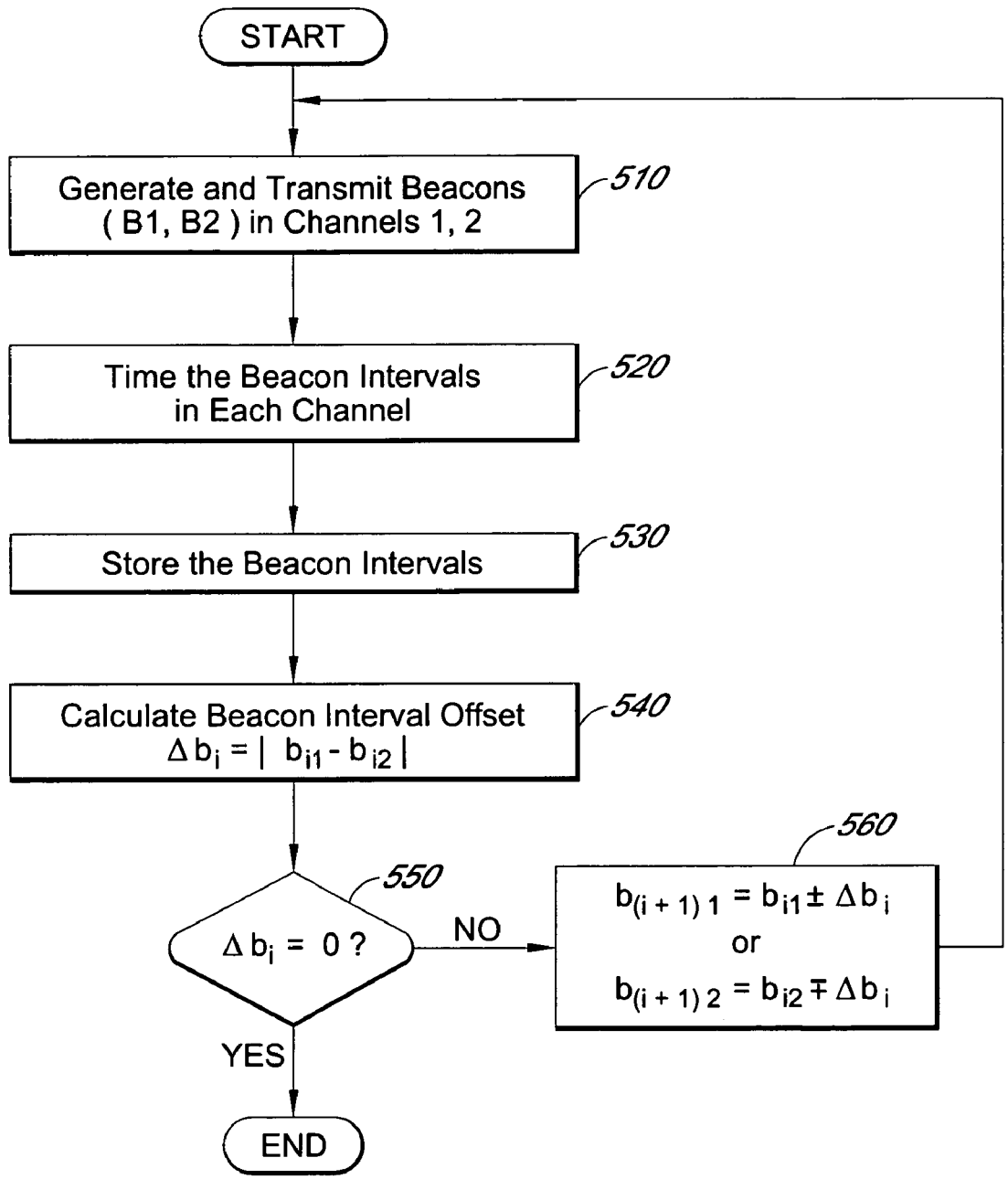
FIG. 5 illustrates an exemplary flowchart which shows a synchronization procedure according to one embodiment of the invention.

In another embodiment, the control module 420 comprises a processor configured to or programmed to perform the synchronization method according to embodiments of the invention such as a procedure illustrated in FIG. 5. The program may be stored in the control module 420 or the memory 430 according to the embodiment.

The control module 420 may have a configuration based on Intel Corporation's family of microprocessors, such as the Pentium family and Microsoft Corporation's windows operating systems such as WINDOWS 95, WINDOWS 98, WINDOWS 2000 or WINDOWS NT. In one embodiment, the control module 420 is implemented with a variety of computer platforms using a single chip or multichip microprocessors, digital signal processors, embedded microprocessors, microcontrollers, etc. In another embodiment, the control module 420 is implemented with a wide range of operating systems such as Unix, Linux, Microsoft DOS, Microsoft Windows 2000/9x/ME/XP, Macintosh OS, OS/2 and the like.

Referring to FIGS. 3-6, the operation of the control module 420 or the access point 310 will be described in more detail. FIG. 5 illustrates an exemplary flowchart which shows a synchronization procedure according to one embodiment of the invention. In one embodiment, the synchronization procedure is implemented in a conventional programming language, such as C or C++ or another suitable programming language. In one embodiment of the invention, the program is stored on a computer accessible storage medium at the access point 310. In one embodiment, it is possible that the program is stored on a computer accessible storage medium of a management console (not shown) that manages and monitors the entire system. In another embodiment, the program is stored in the stations 320 and/or 330 in the configuration where the system operates in "ad hoc mode" (will be explained later: see FIG. 8).

In another embodiment, the program can be stored in other system locations so long as it can perform the synchronization procedure according to embodiments of the invention. The storage medium may comprise any of a variety of technologies for storing information. In one embodiment, the storage medium comprises a random access memory (RAM), hard disks, floppy disks, digital video devices, compact discs, video discs, and/or other optical storage mediums, etc.

Referring to FIG. 5, the control module 420 or the access point 310 generates and transmits first and second series of beacon frames B1 and B2 in channels 1 and 2, respectively (510). In one embodiment, in order to synchronize communication data (or packets) between the stations 320 and 330, the control module 420 or the access point 310 ensures that the beacon transmissions are synchronized. In one embodiment, the control module 420 controls the hardware interface 410 and the Tx/Rx 450 such that the hardware interface 410 generates the beacon frames (B1, B2) and the Tx/Rx 450 transmits the generated beacon frames via channels 1 and 2, respectively.

As shown in FIG. 6A, the first series of beacon frames (B1) include $B_{11}, B_{21}, B_{31}, \ldots, B_{i1}, B_{n1}$, the second series of beacon frames (B2) include $B_{12}, B_{22}, B_{32}, \ldots, B_{i2}, \ldots, B_{n2}$, where n is natural number. In a (ideally) synchronized system, the beacon frames are periodically generated and transmitted, according to the TBTT value of each beacon frame, which means that the interval of two adjacent beacon frames are the same throughout the transmission. However, due to time delay in a system (or an access point) and/or protocol behavior, particularly in the IEEE 802.11 protocols, the beacon interval between two adjacent beacon frames, for example, between $B_{11}$ and $B_{21}$ in channel 1, and between $B_{12}$ and $B_{22}$ in channel 2) may not be the same. This means that the stations 320, 330 are not synchronized with each other. As discussed above, in this situation a receiving station (either station 320 or 330) may have some of the data frames received out of synchronization, and quality of service (QoS) is unlikely to be guaranteed.

The control module 420 or the access point 310 times the beacon intervals ($b_{11}, b_{21}, b_{31}, b_{41}, \ldots$) for the generated beacon frames in each channel (520). Referring to FIGS. 6B and 6C, the beacon intervals ($b_{11}, b_{21}, b_{31}, b_{41}, \ldots$) for the first series of beacon frames (B1) are illustrated and the beacon intervals ($b_{12}, b_{22}, b_{32}, b_{42}, \ldots$) for the second series of beacon frames (B2) are illustrated. "$b_{11}$" represents the interval between the beacon frames $B_{11}$ and $B_{21}$ in channel 1. "$b_{21}$" represents the interval between the beacon frames $B_{21}$ and $B_{31}$ in channel 1. Similarly, "$b_{12}$" represents the interval between the beacon frames $B_{12}$ and $B_{22}$ in channel 2 and "$b_{22}$" represents the interval between the beacon frames $B_{22}$ and $B_{32}$ in channel 2. As an example, $b_{11}$ and $b_{12}$ are 30 milliseconds (msecs) as shown in FIGS. 6B and 6C. In addition, $b_{21}$ and $b_{22}$ are 30 msecs. However, $b_{31}$, representing the interval between the beacon frames $B_{31}$ and $B_{41}$ in channel 1, is 32 msecs. If the TBTT value of the beacon frame $B_{31}$ is set as 30 msecs, "32 msecs" of $b_{31}$ represents that "2 msecs" of time has been delayed than the set TBTT time in that example. That is, the beacon frame $B_{41}$ has been generated in 32 msecs (not in 30 msecs) after the beacon frame $B_{31}$ was generated.

In one embodiment, the control module 420 or the access point 310 times the beacon intervals using a hardware timer of the hardware interface 410. The hardware timer starts timing, as soon as a beacon frame is generated, until the next beacon frame is generated. In one embodiment, if the TBTT value of the beacon frame $B_{11}$ is 30 msecs, the timer downcounts from 30 msecs, from right after the beacon frame ($B_{11}$) is generated, until the next beacon frame ($B_{21}$) is generated, and determines the actual interval between the beacon frames $B_{11}$ and $B_{21}$. The timed beacon intervals are stored, for example, in the memory 430 (530). In one embodiment, this storing procedure may be omitted.

The control module 420 or the access point 310 calculates the beacon interval offset value ($\Delta b_i = |b_{i1} - b_{i2}|$) between one beacon frame ($b_{i1}$) of the first series of beacon frames (B1)

and one beacon frame ($b_{i2}$) of the second series of beacon frames (B2) (540). As discussed above, $b_{i1}$ represents the beacon interval between the $i^{th}$ beacon frame ($B_{i1}$) and the $(i+1)^{th}$ beacon frame ($B_{(i+1)1}$) of the first series of beacon frames (B1). In addition, $b_{i2}$ represents the beacon interval between the $i^{th}$ beacon frame ($B_{i2}$) and the $(i+1)^{th}$ beacon frame ($B_{(i+1)2}$) of the second series of beacon frames (B2).

In the examples shown in FIGS. 6B and 6C, the first interval offset value ($\Delta b_1$) is $|b_{11}-b_{12}|=|30-30|=0$, which means no offset. In addition, the second interval offset value ($\Delta b_2$) is $|b_{21}-b_{22}|=|30-30|=0$, which means no offset. No offset means that the beacon frame transmission for those beacon frames is synchronized. In contrast, the third interval offset value ($\Delta b_3$) is $|b_{31}-b_{32}|=|32-30|=2$ msecs, which means that 2 msecs offset occurred between the beacon frames $B_{31}$ and $B_{41}$.

The control module 420 or the access point 310 determines whether the calculated offset value ($\Delta b_i$) equals to "0" (550). If the beacon interval offset value is "0," the procedure ends since the beacon transmission has been synchronized in each channel.

If, on the other hand, it is determined in procedure 550 that the calculated offset value ($\Delta b_i$) is not equal to "0," procedure 560 is performed. In procedure 560, the (non-zero) interval offset value is either added to or subtracted from the previous beacon interval of one channel (for example, channel 1) while the beacon interval of the other beacon frame of the other channel (for example, channel 2) is maintained. For example, if the interval offset value is "2 msecs" (see "$b_{31}$" in FIGS. 6B and 6C), the fourth beacon frame interval ($b_{41}$) of channel 1 (B1) is adjusted to be 30 msecs by subtracting "2 msecs" (offset value) from 32 msecs ($b_{31}$) whereas the fourth beacon frame interval ($b_{42}$) of channel 2 (B2) is maintained as "30 msecs" (FIG. 6B). In one embodiment, the TBTT value of the beacon frame $B_{41}$ is reset as "30 msecs."

In another embodiment, the fourth beacon frame interval ($b_{42}$) of channel 2 (B2) is adjusted to be 32 msecs by adding "2 msecs" (offset value) to 30 msecs ($b_{32}$) whereas the fourth beacon frame interval ($b_{41}$) of channel 1 (B1) is maintained as "32 msecs" (FIG. 6C). After procedure 560 is performed, procedure 510 is repeated. That is, whenever an interval offset occurs, the procedure of FIG. 5 ensures that the next beacon frame interval is adjusted such that the beacon frames are synchronized. According to embodiments of the invention, the synchronization problem can be solved for the case of multiple channels (either physical or logical). This ensures that the jitter can be significantly reduced or eliminated and thus required QoS is guaranteed. From the standpoint of a receiving station, this means that the received video/audio applications are played smoothly.

In one embodiment, the procedure of FIG. 5 can be applied to synchronization among more than two beacon frames associated with more than two channels, in a similar manner as described above. In one embodiment, a reference channel is selected and a plurality of beacon interval offsets are obtained between the reference channel and each of the other channels. It is assumed that there are first, second and third series of beacon frames (B1, B2, B3) associated with channels 1-3, respectively. It is also assumed that channel 1 is selected as a reference channel. A first offset value ($\Delta b_{i12}$) between two intervals selected from the first and second series of beacon frames (B1, B2) is obtained. Also, a second offset value ($\Delta b_{i13}$) between two intervals selected from the first and third series of beacon frames (B1, B3) is obtained. It is assumed that $\Delta b_{i12}$ is 3 msecs and $\Delta b_{i13}$ is 7 msecs. In one embodiment, in order to synchronize the beacon transmission between channels 1 and 2, 3 msecs is added or subtracted from the previous beacon interval in each channel 1, 2. Similarly, in order to synchronize the beacon transmission between channels 1 and 3, 7 msecs is added or subtracted from the previous beacon interval in each channel 1, 3. Channel 2 or 3 can be selected as a reference channel and the above procedure is similarly performed.

Figure 7:
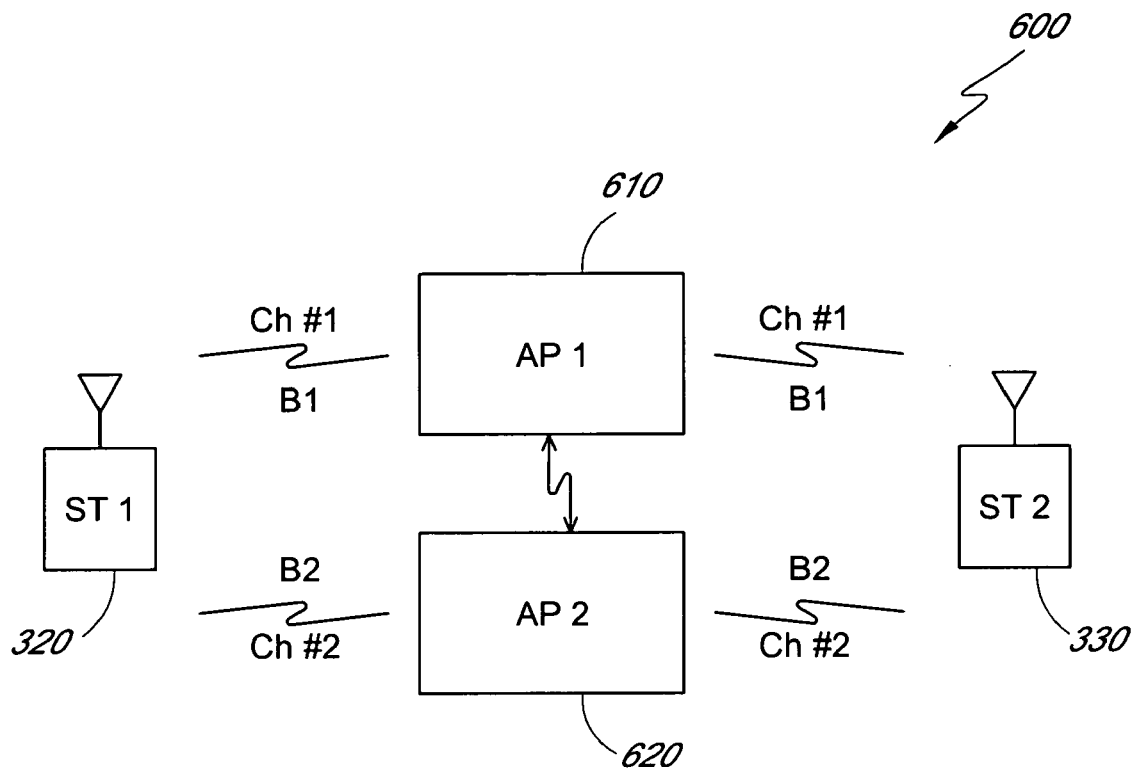
FIG. 7 illustrates a wireless network system according to another embodiment of the invention.

FIG. 7 illustrates a wireless communication network system 600 according to another embodiment of the invention. The system 600 includes access points 610, 620, and first and second stations 320, 330. In one embodiment, each of the stations 320, 330 is a multiple channel based station which handles more than one channel. A first series of beacon frames (B1) are transmitted via channel 1, and a second series of beacon frames (B2) are transmitted via channel 2. However, in this embodiment, each of the access points 610, 620 is a single channel based access point. Thus, the access point 610 wirelessly communicates with the station 320 and 330 via channel 1 and the access point 620 wirelessly communicates with the station 320 and 330 via channel 2. In one embodiment, the access points 610 and 620 are installed together in a single housing (not shown).

In one embodiment, in order to synchronize the beacon frames, the system 600 performs the same procedure as shown in FIG. 5. In one embodiment, the procedure is stored and performed in either the access point 610 or 620. In this embodiment, the access points 610 and 620 are in data communication with each other to perform the beacon synchronization. In another embodiment, the procedure is stored and performed in a single box which contains the access points 610 and 620. In another embodiment, the procedure is stored and performed in a management console, which is in data communication with the access points 610, 620. In the embodiments where the program is not stored in either of the access points 610, 620, the program is in data communication with the access points 610, 620.

Figure 8:
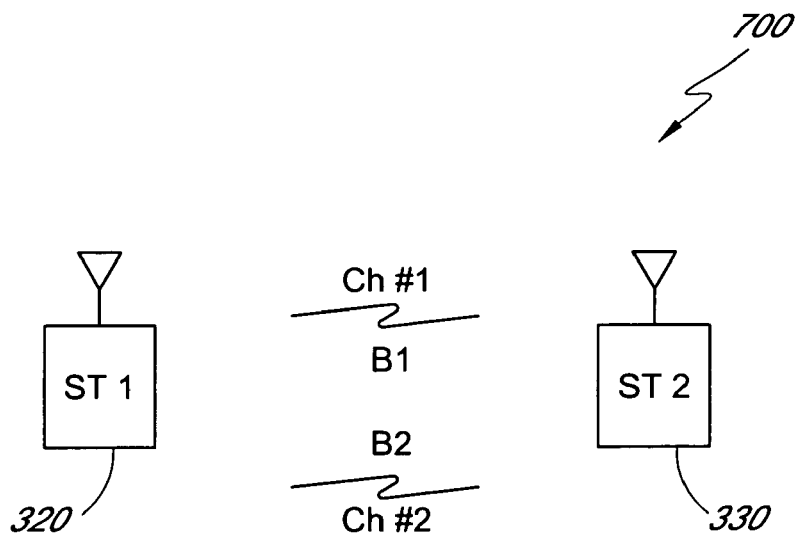
FIG. 8 illustrates a wireless network system according to another embodiment of the invention.

FIG. 8 illustrates a wireless communication network system 700 according to another embodiment of the invention. The stations 320, 330 wirelessly communicate with each other in an ad hoc mode. In ad hoc mode, the stations 320, 330 wirelessly communicate with each other on a peer-to-peer basis, i.e., without an intervening access point. In one embodiment, a transmitting station (either the station 320 or station 330) generates and transmits beacon frames. In one embodiment, each of the stations 320, 330 is a multiple channel based station. A first series of beacon frames (B1) are transmitted via channel 1, and a second series of beacon frames (B2) are transmitted via channel 2. In one embodiment, in order to synchronize the beacon frames, the system 700 performs the same procedure as shown in FIG. 5. In one embodiment, the procedure is stored and performed in either the station 320 or 330.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A method of synchronizing two end terminals in a wireless local area network, the method comprising:
communicating with a first terminal via first and second channels and communicating with a second terminal via the first and second channels;
transmitting a first series of beacon frames ($B_{11}$, $B_{21}$, $B_{31}$, ..., $B_{i1}$, ..., and $B_{n1}$) and a second series of beacon frames ($B_{12}$, $B_{22}$, $B_{32}$, ..., $B_{i2}$, ..., and $B_{n2}$) over the first and second channels, respectively;
obtaining beacon intervals ($b_{i1}$, $b_{i2}$), wherein $b_{i1}$ represents the beacon interval between the $i^{th}$ beacon frame ($B_{i1}$) and the $(i+1)^{th}$ beacon frame ($B_{(i+1)1}$) for the first series of beacon frames and $b_{i2}$ represents the beacon interval between the $i^{th}$ beacon frame ($B_{i2}$) and the $(i+1)^{th}$ beacon frame ($B_{(i+1)2}$) for the second series of beacon frames;
calculating the beacon interval offset value ($\Delta b_i = |b_i 1 - b_i 2|$); and
setting the interval between the beacon frames ($B_{(i+1)1}$ and $B_{(i+2)1}$) in the first channel, and the interval between the beacon frames ($B_{(i+1)2}$ and $B_{(i+2)2}$) in the second channel, based on the calculated offset value ($\Delta b_i$) so as to perform beacon synchronization.

2. The method of claim 1, wherein the wireless local area network includes a multiple channel based access point, and wherein the method is performed in the access point.

3. The method of claim 1, further comprising storing the obtained beacon intervals ($b_{i1}$, $b_{i2}$).

4. The method of claim 1, wherein the setting comprises adding the offset value ($\Delta b_i$) to the previous beacon interval ($b_{i1}$) such that the value ($b_{i1}+\Delta b_i$) is set as the interval between the beacon frames ($B_{(i+1)1}$ and $B_{(i+2)1}$) in the first channel whereas the interval between the beacon frames ($B_{(i+1)2}$ and $B_{(i+2)2}$) in the second channel is maintained.

5. The method of claim 1, wherein the setting comprises subtracting the offset value ($\Delta b_i$) from the previous beacon interval ($b_{i2}$) such that the value ($b_{i2}-\Delta b_i$) is set as the interval between the beacon frames ($B_{(i+1)2}$ and $B_{(i+2)2}$) in the second channel whereas the interval between the beacon frames ($B_{(i+1)1}$ and $B_{(i+2)1}$) in the first channel is maintained.

6. The method of claim 1, wherein the wireless local area network follows the protocol of one of the IEEE 802.11a/11b/11g standards.

7. A method of synchronizing two end terminals in a wireless local area network including an access point, the method comprising:
communicating data wirelessly between the access point and a first terminal via first and second channels and between the access point and a second terminal via the first and second channels;
transmitting, at the access point, a first series of beacon frames ($B_{11}$, $B_{21}$, $B_{31}$, ..., $B_{i1}$, ..., and $B_{n1}$) and a second series of beacon frames ($B_{12}$, $B_{22}$, $B_{32}$, ..., $B_{i2}$, ..., and $B_{n2}$) over the first and second channels, respectively;
obtaining beacon intervals ($b_{i1}$, $b_{i2}$), wherein $b_{i1}$ represents the beacon interval between the $i^{th}$ beacon frame ($B_{i1}$) and the $(i+1)^{th}$ beacon frame ($B_{(i+1)1}$) for the first series of beacon frames and $b_{i2}$ represents the beacon interval between the $i^{th}$ beacon frame ($B_{i2}$) and the $(i+1)^{th}$ beacon frame ($B_{(i+1)2}$) for the second series of beacon frames;
storing the obtained beacon intervals ($b_{i1}$, $b_{i2}$);
calculating, at the access point, the beacon interval offset value ($\Delta b_i = |b_i 1 - b_i 2|$); and
setting, at the access point, the interval between the beacon frames ($B_{(i+1)1}$ and $B_{(i+2)1}$) in the first channel, and the interval between the beacon frames ($B_{(i+1)2}$ and $B_{(i+2)2}$) in the second channel, based on the calculated offset value ($\Delta b_i$) so as to perform beacon synchronization.

8. The method of claim 7, wherein the obtaining of the beacon intervals comprises timing the intervals ($b_{i1}$, $b_{i2}$) between the $i^{th}$ beacon frames ($B_{i1}$, $B_{i2}$) and the $(i+1)^{th}$ beacon frames ($B_{(i+1)1}$, $B_{(i+1)2}$), respectively, using a hardware timer.

9. The method of claim 7, wherein each of the channels is either a physical channel or a logical channel.

10. A system for synchronizing two end terminals in a wireless local area network, comprising:
a control module programmed to i) communicate with a first terminal via first and second channels and communicate with a second terminal via the first and second channels, ii) transmit a first series of beacon frames ($B_{11}$, $B_{21}$, $B_{31}$, ..., $B_{i1}$, ..., and $B_{n1}$) and a second series of beacon frames ($B_{12}$, $B_{22}$, $B_{32}$, ..., $B_{i2}$, ..., and $B_{n2}$) over the first and second channels, respectively, iii) obtain beacon intervals ($b_{i1}$, $b_{i2}$), wherein $b_{i1}$ represents the beacon interval between the $i^{th}$ beacon frame ($B_{i1}$) and the $(i+1)^{th}$ beacon frame ($B_{(i+1)1}$) for the first series of beacon frames and $b_{i2}$ represents the beacon interval between the $i^{th}$ beacon frame ($B_{i2}$) and the $(i+1)^{th}$ beacon frame ($B_{(i+1)2}$) for the second series of beacon frames, iv) calculate the beacon interval offset value ($\Delta b_i = |b_i 1 - b_i 2|$) and v) set the interval between the beacon frames ($B_{(i+1)1}$ and $B_{(i+2)1}$) in the first channel, and the interval between the beacon frames ($B_{(i+1)2}$ and $B_{(i+2)2}$) in the second channel, based on the calculated offset value ($\Delta b_i$) so as to perform beacon synchronization; and
a memory in data communication with the control module and configured to store information for beacon synchronization;
wherein the control module and the memory are integrated in an access point.

11. The system of claim 10, wherein the access point comprises a multi channel medium access control (MC-MAC) based access point.

12. The system of claim 10, wherein the access point comprises first and second access points being in data communication with each other, the first access point being in data communication with the first and second stations via the first channel, the second access point being in data communication with the first and second stations via the second channel.

13. The system of claim 12, wherein the first and second access points are installed together in a single unit.

14. The system of claim 10, wherein the control module is further configured to add the offset value ($\Delta b_i$) to the previous beacon interval ($b_{i1}$) such that the value ($b_{i1}+\Delta b_i$) is set as the interval between the beacon frames ($B_{(i+1)1}$ and $B_{(i+2)1}$) in the first channel whereas the interval between the beacon frames ($B_{(i+1)2}$ and $B_{(i+2)2}$) in the second channel is maintained.

15. The system of claim 10, wherein the access point further comprises a hardware timer configured to time the beacon intervals ($b_{i1}$, $b_{i2}$) between the $i^{th}$ beacon frames ($B_{i1}$, $B_{i2}$) and the $(i+1)^{th}$ beacon frames ($B_{(i+1)1}$, $B_{(i+1)2}$), respectively.

16. The system of claim 10, wherein the wireless local area network comprises the IEEE 802.11a/11b/11g networks.

17. A system for synchronizing two end terminals in a wireless local area network, comprising:

a control module programmed to perform i) communicate with a first terminal via first and second channels and communicate with a second terminal via the first and second channels, ii) transmit a first series of beacon frames ($B_{11}$, $B_{21}$, $B_{31}$, ..., $B_{i1}$, ..., and $B_{n1}$) and a second series of beacon frames ($B_{12}$, $B_{22}$, $B_{32}$, ..., $B_{i2}$, ..., and $B_{n2}$) over the first and second channels, respectively, iii) obtain beacon intervals ($b_{i1}$, $b_{i2}$), wherein $b_{i1}$ represents the beacon interval between the $i^{th}$ beacon frame ($B_{i1}$) and the $(i+1)^{th}$ beacon frame ($B_{(i+1)1}$) for the first series of beacon frames and $b_{i2}$ represents the beacon interval between the $i^{th}$ beacon frame ($B_{i2}$) and the $(i+1)^{th}$ beacon frame ($B_{(i+1)2}$) for the second series of beacon frames, iv) calculate the beacon interval offset value ($\Delta b_i = |b_i 1 - b_i 2|$) and v) set the interval between the beacon frames ($B_{(i+1)1}$ and $B_{(i+2)1}$) in the first channel, and the interval between the beacon frames ($B_{(i+1)2}$ and $B_{(i+2)2}$) in the second channel, based on the calculated offset value ($\Delta b_i$) so as to perform beacon synchronization; and a memory in data communication with the control module and configured to store information for beacon synchronization;

wherein the control module and the memory are integrated in at least one of the first and second terminals.

18. The apparatus of claim 17, wherein the control module is further configured to subtract the offset value ($\Delta b_i$) from the previous beacon interval ($b_{i2}$) such that the value ($b_{i2} - \Delta b_i$) is set as the interval between the beacon frames ($B_{(i+1)2}$ and $B_{(i+2)2}$) in the second channel whereas the interval between the beacon frames ($B_{(i+1)1}$ and $B_{(i+2)1}$) in the first channel is maintained.

19. The system of claim 17, wherein each of the terminals comprises one of the following: a personal computer (desktop, laptop, palmtop), a mobile phone, or other portable communication devices such as a hand-held PC, a wallet PC and a personal digital assistant (PDA).

20. A system for synchronizing two end terminals in a wireless local area network, the apparatus comprising:

means for communicating with a first terminal via first and second channels and communicating with a second terminal via the first and second channels;

means for transmitting a first series of beacon frames ($B_{11}$, $B_{21}$, $B_{31}$, ..., $B_{i1}$, ..., and $B_{n1}$) and a second series of beacon frames ($B_{12}$, $B_{22}$, $B_{32}$, ..., $B_{i2}$, ..., and $B_{n2}$) over the first and second channels, respectively;

means for obtaining beacon intervals ($b_{i1}$, $b_{i2}$), wherein $b_{i1}$ represents the beacon interval between the $i^{th}$ beacon frame ($B_{i1}$) and the $(i+1)^{th}$ beacon frame ($B_{(i+1)1}$) for the first series of beacon frames and $b_{i2}$ represents the beacon interval between the $i^{th}$ beacon frame ($B_{i2}$) and the $(i+1)^{th}$ beacon frame ($B_{(i+1)2}$) for the second series of beacon frames;

means for calculating the beacon interval offset value ($\Delta b_i = |b_i 1 - b_i 2|$); and means for setting the interval between the beacon frames ($B_{(i+1)1}$ and $B_{(i+2)1}$) in the first channel, and the interval between the beacon frames ($B_{(i+1)2}$ and $B_{(i+2)2}$) in the second channel, based on the calculated offset value ($\Delta b_i$) so as to perform beacon synchronization.

* * * * *